May 7, 1957 R. C. RUSSELL 2,791,129
SCREW-NUT ACTUATOR
Filed Oct. 1, 1954 2 Sheets-Sheet 1

INVENTOR.
ROBERT C. RUSSELL
BY
Attorneys

May 7, 1957 R. C. RUSSELL 2,791,129
SCREW-NUT ACTUATOR
Filed Oct. 1, 1954 2 Sheets-Sheet 2

INVENTOR.
ROBERT C. RUSSELL
BY
Attorneys

United States Patent Office 2,791,129
Patented May 7, 1957

2,791,129

SCREW-NUT ACTUATOR

Robert C. Russell, Shaker Heights, Ohio, assignor to Eaton Manufacturing Company, Cleveland, Ohio, a corporation of Ohio Application October 1, 1954, Serial No. 459,633

13 Claims. (Cl. 74—441)

This invention relates to mechanical movement and more particularly to mechanism of the screw-nut actuator type embodying novel features of construction providing for improved operating characteristics.

Broadly the invention comprehends the provision of a screw-nut actuator for converting rotary motion of a power motive means into linear or reciprocating motion of a member to be actuated in the performance of useful work, and constitutes in its basic embodiment, a screw, a nut engageable therewith, means on the screw for limiting the axial movement of the nut relative to the screw, and a sleeve structure rotatably mounted on the nut and limited to axial movement thereon.

Although numerous variations in screw-nut actuators have been devised and manufactured for use in converting rotor motion into reciprocating motion in many commercial applications for aircraft, trucks, passenger automobiles, etc., none heretofore have been of a construction permitting of economical production thereof while being highly efficient in operation. The present screw-nut actuator clearly fulfills these requirements while being simple in structure.

Among the principal objects of the invention is the provision of a screw-nut actuator mechanism, that:

(a) Provides a highly efficient operating unit that will not jam or "lock-up" when the nut reaches either end of its travel or when the nut comes into contact with a prearranged fixed stop means;

(b) Provides a structure which will avoid jamming or lock-up regardless of the thread angle;

(c) Utilizes nut and screw members having conventional make threads;

(d) Permits of the rotation under load of either the nut or screw after one or the other has ceased axial movement by coming into contact with a stop means;

(e) Permits of normal reciprocatory motion of a member having bearing association with the nut thereof over a predetermined range of desirable relative axial movement between the nut and screw;

(f) Permits of the utilization of materials of lowest possible coefficient of friction; and, (g) Is simple and economical in construction and provides long lived efficient operation.

Other objects and advantages of the invention will appear from the following description taken in connection with the drawings forming a part of the specification, and in which.

Figure 1:
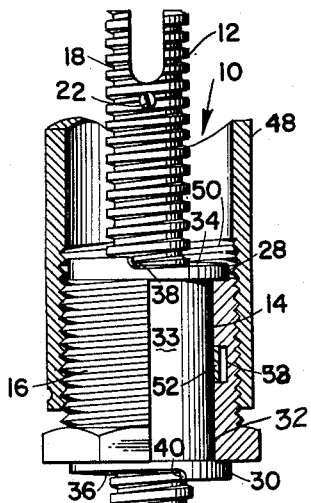
Fig. 1 is a partly fragmentary, partly cross-sectionalized view of a screw-nut motion transmitting mechanism.

This invention is directed at the provision of a screw-nut actuator mechanism for use in converting rotary motive power to linear motion such as for the actuation of vehicle seat adjusters, transmission shift mechanisms and the like wherein structural simplicity, cost and efficiency of operation are paramount factors to be considered. Inasmuch as high efficiency, or in other words, low frictional loss is of utmost importance so as to require the minimum in operating power the threads should be either of square or modified acme form; the pitch diameters should be no greater than is necessary to provide sufficient strength to carry the load for which designed; the thread should be so designed that under a high axial load, when the nut is pushed into the screw the crest of the thread in the nut in carrying the radial load should contact the root of the threads on the screw so as to prevent wedging and to keep sliding friction to a minimum between the screw and the nut, and the mechanism should be made of material having sufficient strength and the lowest possible coefficient of friction.

Referring to Figs. 1 through 7 for more specific features of the invention 10 represents a screw-nut actuator mechanism comprising basically a screw 12, a nut 14, and a split sleeve 16.

Screw 12, preferably provided with an acme form thread 18, is adapted at one end 20 thereof to be connected to rotary motive power means therefor, not shown, such as an electric motor and is provided near opposite ends of threaded portions thereof with stop means in the form of radially projecting pins 22 and 24, the purpose of which will hereinafter appear.

Figure 4:
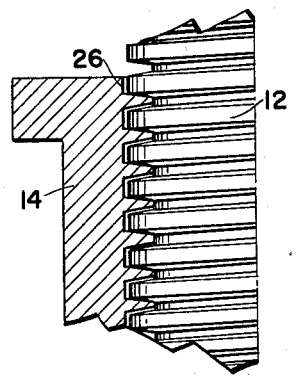
Fig. 4 is an enlarged fragmentary and partly cross-sectionalized view of the thread relation between the nut and screw of the mechanism of Fig. 1.
Figure 2:
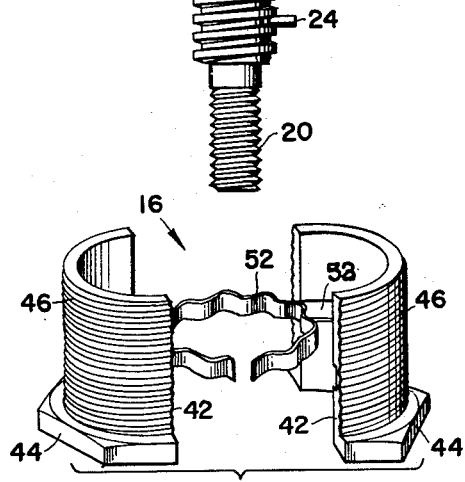
Fig. 2 is a perspective separated view of the sleeve and spring elements of the mechanism of Fig. 1.

Nut 14 threadedly engageable on screw 12 for relative axial and rotative movement thereon between pins 22 and 24 is provided with a modified acme thread 26 so as to provide thread engagement with screw 12 as shown by Fig. 4 wherein the root of thread 18 of screw 12 engages the crest of thread 26 of nut 14 whereby the minimum radius arm of frictional engagement is had between the screw and the nut. With the crest of thread 18 of screw 12 engaging the root of thread 26 of nut 14, with the crest of thread 26 of nut 14 radially spaced from the root of thread 18 of screw 12, and with the provision of axial clearance as to the engagement of sides of threads 18 and 26 with one another, the possibility of wedging action occurring between the threads of the screw and nut is eliminated. As viewed in Fig. 4 whereas the crest of thread 18 engages the root of thread 26, the root of thread 18 is spaced from the crest of thread 26 and one side of threads 18 and 26 are engageable with one another whereas the other respective sides thereof are axially spaced from one another. This condition of engagement between one side of threads 18 and 26 exists for one axial direction loading between the screw and nut whereas a direct opposite sides of engagement of the nut and screw will occur for an opposite loading between the screw and nut. Regardless of the direction of axial loading between the screw and nut and any side thrust acting to shift the axes of the screw and nut relative to one another, the relation of size of the threads to one another as provided herein prevents wedging or locking between the screw and nut. As such the sliding friction between the screw and nut is maintained at a minimum lending toward the higher efficiency of operation thereof. Nut 14 is in the form of a spool providing flanges 28 and 30 on opposite ends thereof with an annular channel 32 therebetween radially outwardly disposed of a cylindrical surface 33. The outward axial extremities of the flanges 28 and 30 are each formed to provide helical surfaces 34 and 36 respectively of substantially identical lead with the thread of the screw and nut, the purpose of which will hereinafter appear. Surfaces 34 and 36 in their path of movement provide respective shoulders 38 and 40 lying in planes passing through and along the axis of the screw and nut, with said shoulders being adapted to be engaged respectively by pins 22 and 24 when the nut reaches its predetermined limits of axial movement on the screw.

Split sleeve 16, comprises a pair of semi-cylindrical members 42, providing in assembly an internal cylindrical surface having a radius substantially identical with the radius of the cylindrical surface 33 and axial length slightly less than the axial length of surface 33 between flanges 28 and 30. Each of the half sleeve members 42 is provided at one end with a semi-hexagonal exterior formed radial flange 44 and an exteriorly threaded body portion 46 such that upon assembly of the members 42 in bearing engagement on nut 14 between flanges 28 and 30 thereof, a complete hexagonal body for suitable wrench application is had as well as a complete cylindrical externally threaded body. As a means of suitably securing the members 42 together in assembly on nut 14 a tubular member 48 having an internal thread 50 thereon near one end thereof for suitable threading engagement with threaded body portions of sleeve 16. In addition to the threaded engagement between sleeve 16 and member 48, a staking thereof is provided so as to insure against rotation therebetween in operation. Member 48 is adapted to be secured at one end, not shown, axially oppositely disposed from the threaded end thereof with apparatus to be reciprocated by the screw-nut actuator. As such member 48 is adapted to be inhibited from rotation and is confined to solely reciprocatory movement. Because of the coupling together of sleeve 16 and member 48, sleeve 16 is likewise limited to solely reciprocatory, non-rotative movement.

Split sleeve 16 is held in frictional engagement on nut 14 through the provision of an annular wave spring 52 disposed radially between surface 33 and a cylindrical surface 53 provided internally of sleeve 16 in the provision of an annular groove 54 internally thereof intermediate of its axial length. Spring 52 imposes a frictional holding force between sleeve 16 and nut 14 such as to overcome any resistance to rotation present between the screw and nut, due to thread friction, heavy grease, or foreign matter therebetween when the screw is rotated in a direction acting to move the nut axially away from an end position on the screw.

In a normal operation of the mechanism 10, with the nut 14 in a position of rest on the screw adjacent pin 24, the nut 14 upon clockwise rotation of screw 12 will be moved axially along screw 12 toward pin 22. This movement of the nut is possible since spring 52 imposes a sufficient load between nut 14 and sleeve 16 to move as a unit and overcome any resistance tending to cause the nut to rotate with the screw and slip or rotate relative to sleeve 16 which is inhibited from rotation by reason of its coupled relation with member 48 and the required connection of member 48 with apparatus, not shown, whereby it is restrained from rotation.

With the continued rotation of screw 12 in a clockwise direction and a traversing of the length of the screw by nut 14, shoulder 38 at surface 34 of the nut engages pin 22 such as to cause the nut to become coupled with the screw whereupon with further continued rotation of the screw, the nut is made to rotate with the screw and slip or rotate relative to sleeve 16. This constitutes a predetermined end limit of axial movement of sleeve 16 and member 48. With rotation occurring between nut 14 and sleeve 16 as a result of continued rotation of screw 12 and an overcoming of resistance of spring 52 a non-jamming overrunning operation of mechanism 10 is achieved such that the mechanism is free to initiate an opposite axial movement of sleeve 16 away from pin 22 upon reverse operative rotation of screw 12. By reason of pins 22 and 24 engaging the shoulders 38 and 40 of the nut in a circumferential path of movement of the nut no binding or jamming of the threads 18 and 26 of the respective screw and nut is possible and their thread relation is maintained as for any position of axial movement between the screw and nut.

Figure 5:
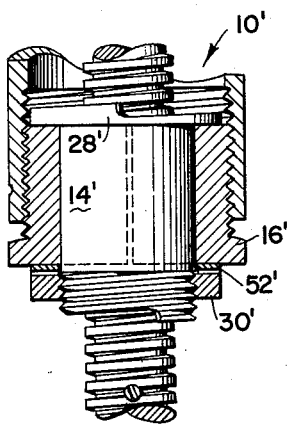
Fig. 5 is a partly fragmentary, partly cross-sectionalized view of a modified mechanism from that of Figs. 1 through 4.
Figure 3:
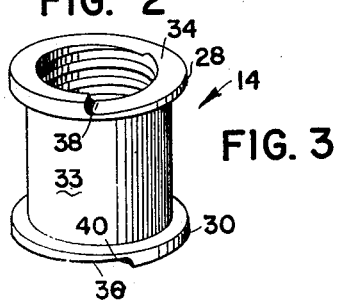
Fig. 3 is a perspective view of the nut of the mechanism of Fig. 1.

Fig. 5 is a modification of the structure of Figs. 1 through 4 in that a sleeve 16' of one-piece construction is provided mounted for rotation on a nut 14' of a mechanism 10' including a flange 28' at one end thereof and a washer or annular member 30' threaded upon nut 14' on its opposite end from flange 28'. Flange 28' and washer 30' serve in a like manner as flanges 28 and 30 of nut 14 to confine sleeve 16' therebetween. A spring 52' disposed axially between one axial end of sleeve 16' and washer 30' serves a like purpose as spring 52 of mechanism 10 in offering resistance to rotation between sleeve 16' and nut 14'.

Figure 7:
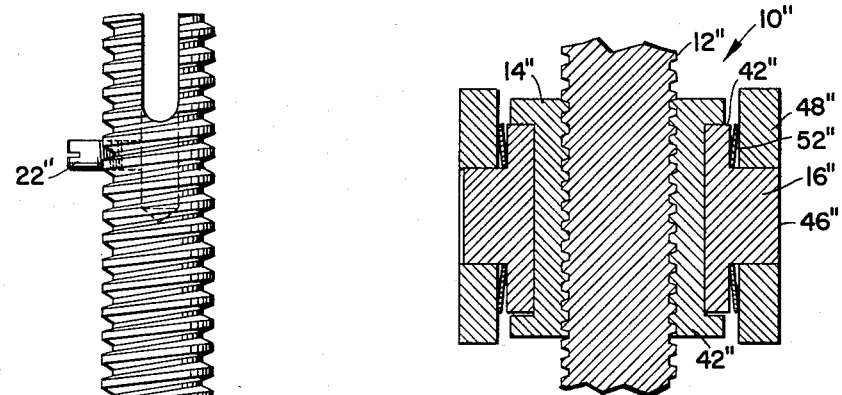
Figure 6:
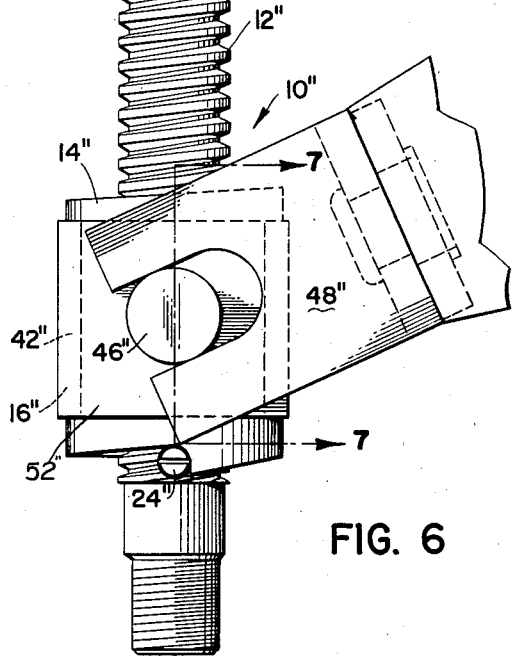
Fig. 6 is a partly fragmentary view of another modified screw-nut mechanism; and, Fig. 7 is a cross-sectional view taken substantially along lines 7—7 of Fig. 6.

Figs. 6 and 7 disclose a modified mechanism 10'' from that of either mechanism 10 or 10'. Mechanism 10'' provides a specific design for use in the shifting of gear mechanisms or the like and includes a screw 12'', a nut 14'', a split sleeve or trunnion block 16'', stop pins 22'' and 24'' on the screw and a yoke 48''. Wave springs 52'' are mounted between yoke 48'' and trunnion 16'' acting to place a frictional load between nut 14'' and trunnion 16''.

Trunnion 16'' includes a pair of like members 42'' each having a radial outward projecting pin 46'', engaged by the arms of yoke 48'' for sliding engagement therewith. Yoke 48'' is adapted to be pivoted or rocked about its axis in the desired fore or aft shifting of gearing, not shown, adapted to be actuated by the yoke.

Aside from the variation in structure of mechanisms 10, 10' and 10'' the operation of the nut and screw relative to one another and the sleeve rotatably mounted on the nut is identical.

In view of the desire to obtain the highest degree of efficiency, or in other words, lowest possible coefficient of friction between the screw and nut, and nut and sleeve of the various mechanisms 10, 10' and 10'' it is preferable, wherever possible, to make these elements of nylon or other like material, having a low coefficient of friction. If strength requirements so dictate an element, such as the screw, should be made of hardened steel. In making the various elements of nylon, as by known molding processes, a decided cost saving is had and furthermore, with the nut being made of nylon, its engagement with the stop pins at either end of its travel at high velocity is not injurious to the nut due to its light weight and yieldability.

Although the mechanisms 10, 10' and 10'' are specific in form and wherein in each case the screw is the power rotated member, it is conceivable that other various modifications in structure are possible without departing from the basic concept of the invention, that is a structure embodying a pair of threadedly engageable members, a member rotatably supported by one of the members, depending on which is rotatively driven by motive power means, means for imposing a frictional load between the threadedly engageable member, and stop means for predeterminedly limiting the axial extent of movement between the threadedly engageable members whereby a non-jamming, overrunning screw and nut actuator mechanism is had. It is thus conceivable that the nut could be power rotated instead of the screw, and that the screw could be then held to solely reciprocating motion and having associated therewith a suitable output member supported thereby for rotation relative thereto. The claims are accordingly to be interpreted in the light thereof.

What I claim is:

1. A movement transmitting mechanism comprising a first threaded member, a second threaded member threadedly engaged with said first member, a sleeve structure supported for rotation on and solely rotative relative to first member, said sleeve structure having a smooth internal cylindrical surface, said first member having a smooth external cylindrical surface radially spaced from said cylindrical surface on the sleeve structure, spring means frictionally engageable between said cylindrical surfaces of said sleeve structure and said first member, and means confining said spring means axially of said sleeve structure and said first member.

2. A mechanism according to claim 1, wherein said second member has stop means projecting radially from the threaded surface thereof and said first member is provided on one end thereof with an axially extended surface engageable with said stop means.

3. A mechanism according to claim 2 wherein said axially extended surface lies in a plane passing through and along the axis of said first and second members.

4. A mechanism according to claim 2 wherein the threadedly engaged members constitute a nut and screw apparatus.

5. A movement transmitting mechanism comprising a first threaded member which is adapted to be rotatively powered, a second threaded member threadedly engageable with said first member, said second threaded member having a smooth continuous annular surface, a structure rotatively supported on said second member and inhibited from axial movement relative thereto, said structure having a smooth continuous annular surface-bottomed groove with said surface thereof spaced from the annular surface on said second member and annular resilient means disposed between and frictionally engageable upon the smooth surfaces of said structure and second member and disposed in the groove of the structure, and means engageable between said first and second members for limiting axial movement therebetween.

6. A mechanism according to claim 5 wherein said means includes a pin on said first member, and a shoulder on said second member circumferentially engageable with said pin.

7. A mechanism according to claim 5 wherein said first member is a screw and said second member is a nut.

8. A mechanism according to claim 7 wherein said structure is a sleeve supported radially outwardly on said nut.

9. A mechanism according to claim 8 wherein said nut is spool shaped having axial end flanges and said sleeve is disposed on said nut confined axially of said flanges.

10. A mechanism according to claim 9 wherein said sleeve comprises a pair of half sleeve segments coupled together.

11. A mechanism according to claim 9 wherein said resilient means is in the form of wave spring means.

12. A mechanism according to claim 11 wherein said wave spring means is disposed radially between said second member and said sleeve.

13. A movement transmitting mechanism comprising a pair of threadedly engaged concentric members, a third member supported for rotation by one of said pair of members and stop means on the member of said pair of members which does not support the third member, said other member of said pair of members having a part engageable with said stop means in a circumferential path of movement of said other member, the outer concentric member of said pair of members having the crest of its threads engageable with the root of the threads of the inner concentric member, whereas the crest of the threads of the inner concentric member is inward radially spaced from the root of the threads of the outer concentric member, and wherein the axial width of the threads of said outer concentric member is less than the axial width of the threads of said inner concentric member, such that both sides of the threads of said concentric members are not engageable at the same time.

References Cited in the file of this patent

UNITED STATES PATENTS

| | | |
|---|---|---|
| 2,215,107 | Mulke | Sept. 17, 1940 |
| 2,701,478 | Riess | Feb. 8, 1955 |
| 2,719,036 | Brundage | Sept. 27, 1955 |

FOREIGN PATENTS

| | | |
|---|---|---|
| 146,527 | Sweden | Aug. 17, 1954 |

OTHER REFERENCES

Publication: Machine Design, March 1954, page 156.